May 21, 1935.  C. A. HULTQUIST  2,002,203
ROCK DRILL CHUCK
Filed Aug. 20, 1930
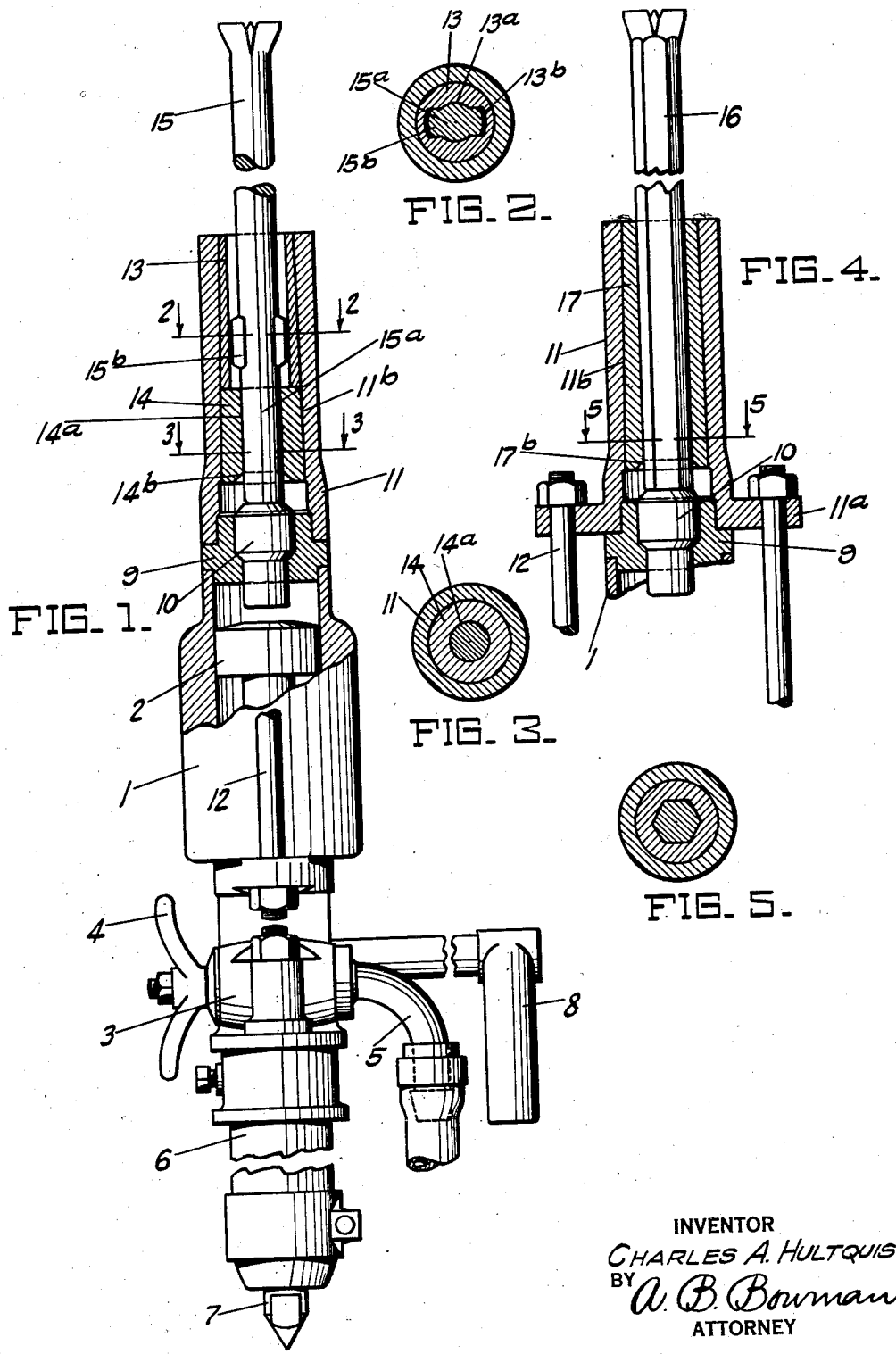
INVENTOR
CHARLES A. HULTQUIST
BY
A. B. Bowman
ATTORNEY Patented May 21, 1935

2,002,203

UNITED STATES PATENT OFFICE 2,002,203

ROCK DRILL CHUCK

Charles A. Hultquist, Los Angeles, Calif., assignor to Independent Pneumatic Tool Company, Chicago, Ill., a corporation of Delaware Application August 20, 1930, Serial No. 476,554

4 Claims. (Cl. 308—4)

This invention relates to rock drilling machines, and more particularly to a chuck for such machines which supports or holds the drill steel and also more particularly to chucks in the class of machines known in trade as stope drills.

The objects of this invention are: first, to provide a chuck or support for machines of this class which is strong, which may be rigidly held with respect to the machine, which is comparatively light, and which may be easily removed so that it can be readily replaced when worn or when a different shape or section of drill steel is to be used without the necessity of replacing the whole front head of the machine; second, to provide a device of this class in which the drill steel receiving and holding sleeve or sleeve means is non-rotatably and frictionally secured in the head end of the drilling machine by tapered engaging surfaces between the sleeve means and head, forming a very economical drill steel holding or supporting means; third, to provide a device of this class in which the tapered drill steel receiving and holding sleeve or sleeve means is periodically forced into the tapered bore of the head by the anvil block of the machine which actuates the drill steel in the drilling operation; fourth, to provide a device of this class in which only a portion or outer portion of the drill steel receiving and holding sleeve means need be replaced in case of wear; and, fifth, to provide, as a whole, a novelly constructed drill steel chuck, and one which is simple of construction and which will not readily get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a fragmentary side elevational view of a stope drill embodying my present invention and showing the same in connection with a drill steel known as a lug steel, certain parts and portions of the machine and chuck being broken away and in section to facilitate the illustration; Figs. 2 and 3 are, respectively, transverse sectional views thereof taken through 2—2 and 3—3 of Fig. 1; Fig. 4 is a fragmentary sectional view of the front or head end of the stope drill, but taken at a right angle to that shown in Fig. 1, showing my invention embodied therein and used in connection with a straight shank drill steel; and, Fig. 5 is a transverse sectional view thereof taken through 5—5 of Fig. 4.

Like characters of reference refer to similar parts and portions throughout the views of the drawing.

The drilling machine or stope drill, shown in the drawing, is of ordinary or conventional construction and consists essentially of an operating cylinder 1, a reciprocating hammer 2, a throttle block or valve 3 for controlling the air to the cylinder, a throttle handle 4 for controlling the throttle valve, the air inlet connection 5 leading to the throttle valve, a feed cylinder 6 upon which the throttle block, operating cylinder, and the like, are supported, a feed rod 7 extending below the feed cylinder 6, a rotation handle 8 for rotating the drilling machine, an anvil block seat member 9 secured to the upper end of the operating cylinder 1, and an anvil block 10 reciprocally mounted in the anvil block seat and in alignment with the hammer 2.

Seated on the end and around the anvil block seat member 9, and extending outwardly therefrom and in alignment therewith, is a cylindrical head 11. This head is provided at its inner end with diametrically opposed lugs 11a through which extend bolts 12 for securing the head 11 to the seat member 9 and the seat member 9 to the cylinder 1. The head 11 is provided with a central tapered bore 11b which diverges inwardly from the outer end of the head to substantially the seat member 9. Within the tapered bore of the head are positioned an outer chuck bushing or sleeve 13 and an inner chuck bushing or sleeve 14. These bushings or sleeves are provided with external tapers conforming to the taper of the head and are positioned in tight abutted relation within the bore of the head. The drill steel 15, shown in Figs. 1 and 2, is a conventional drill steel known as lug steel having a straight round shank 15a and diametrically opposed lugs 15b which are spaced from the end of the shank inserted in the chuck of the drilling machine. The inner bushing or sleeve 14 is provided with a round central longitudinal bore or hole 14a which receives the end of the drill steel shank so that the drill steel may be easily removed therefrom. The outer chuck bushing or sleeve 13 is also provided with a central bore 13a in alignment with the bore 14a for receiving the drill steel shank, but the same is also provided at diametrically opposite sides of the bore with longitudinal slots or grooves 13b for receiving the lugs 15b of the drill steel to prevent the drill steel from rotating relative to the outer bushing or sleeve 13 and the head 11, as will be described specifically hereafter. These bushings or sleeves 13 and 14 are inserted into the tapered bore of the head 11 before the head is placed and secured in position and are driven lightly into place. At the inner end of the inner sleeve 14, and around the hole 14a, is provided a beveled seat 14b which is adapted to be engaged by the outer end of the anvil block 10 when the drill steel is forced outwardly a sufficient distance to permit such engagement. Such engagement of the anvil block with the inner sleeve 14, which occurs periodically during the drilling operation, forces and retains the bushings 13 and 14 tightly in engagement with the tapered wall of the bore of the head so as to prevent the bushings or sleeves from rotating relative to the head.

The taper of the bore 11b and of the external surfaces of the sleeves 13 and 14 is relatively slight. I have found by experiment that this taper may vary between one-eighth and one-half inch to the foot, but the best results are obtained with a taper of approximately one-fourth inch to the foot. This taper must be such that when the sleeves 13 and 14 are driven into place, they are held by frictional engagement against the tapered walls of the bore 11b so that they do not rotate relative to the head when the drill steel is stuck in the hole being drilled and the drilling machine is rotated by the handle 8. This taper, however, must also be great or quick enough so that the chuck bushings or sleeves may be removed from the head in an ordinary blacksmith shop by placing a block of iron on the small end of the outer bushing or sleeve 13 and striking the iron with a sledge, since other tools are seldom available where rock drills are used.

The chuck bushing or sleeve means, shown in Fig. 1, is made in two pieces, or two separate members, on account of economy of manufacture. The lugs on the drill steel enter the chuck only part way. Therefore, there need be no slots or grooves at the inner end of the sleeve means. Also, the outer end of the sleeve means wears more quickly than the inner end. Thus only the outer chuck bushing or sleeve need be replaced. It will be also noted that by providing only a round hole 14a in the inner sleeve 14, dirt, sand and grit is prevented to a large extent from passing inwardly beyond the inner sleeve, such dirt, sand or grit being also prevented to a large extent from entering between the rock drill and the sleeve 14 by slight leakage of air from the rock drill cylinder.

The drill steel 16, shown in Fig. 4, is a straight shank drill steel of polygonal cross section from end to end. When such a drill steel is used, the bore in the sleeve means, which is here indicated as a single sleeve 17, is uniform and is also of polygonal cross section for receiving the shank of the drill steel and holding the same against rotation relative to the head 11. The taper of the bore 11b of the head 11 and the external taper of the chuck bushing or sleeve 17, in this instance, is also the same as the taper described in connection with the structure shown in Fig. 1. The sleeve 17, in this instance, is also provided at its inner end and around its central bore with a beveled seat 17b which is adapted to be engaged by the anvil block 10, as described above.

Though I have shown and described a particular construction, combination and arrangement of parts and portions of a rock drill chuck and a certain modification thereof, and also a certain application thereof, I do not wish to be limited to this particular construction, combination and arrangement, nor to the modification, nor to the particular application, but desire to include in the scope of my invention the construction, combination and arrangement substantially as set forth in the appended claims.

Having thus described my invention, what I claim as new and desire to secure by Letters Patent is:

1. In a rock drill of the class wherein there is, a cylinder, an anvil block reciprocally mounted at one end thereof, the combination with said cylinder and anvil block of a cylindrical head extended from said end of the cylinder and secured relative thereto, said head having a tapered bore in substantial alignment with the longitudinal axis of said anvil block and diverging inwardly from its outer end toward the anvil block, and a pair of tapered sleeve members positioned end to end and in abutted relation in the tapered bore and both removable from the inner end of the head, the inner sleeve member being adapted to receive the inner end of a drill steel shank and forming a bearing therefor and the outer sleeve having a special bore and groove portion shaped and arranged to receive a key portion of the shank of the drill steel, the inner end of the inner sleeve having a beveled seat around the drill steel shank adapted to be engaged by the anvil block.

2. In a device of the class described, a rock drill head having a slightly tapered bore diverging inwardly from its outer end, and a pair of tapered sleeve members positioned end to end and in abutted relation in the tapered bore and both removable from the inner end of the head, only the inner sleeve member being adapted to receive the inner end of a drill steel shank and the outer sleeve having a bore and groove portion adapted to receive a key portion of the shank of the drill steel.

3. In a device of the class described, a rock drill head having a slightly tapered bore diverging inwardly from its outer end, and a pair of tapered sleeve members positioned end to end and in abutted relation in the tapered bore and both removable from the inner end of the head, only the inner sleeve member having a round central bore adapted to receive the end of a drill steel shank and the outer sleeve member having a central bore in alignment with the bore of the inner sleeve member and also provided with diametrically opposed grooves radiating from the bore adapted to receive key portions on the shank of the drill sleeve.

4. In a rock drill, a rock drill head in hollow cylindrical form having a slightly tapered bore diverging inwardly from its outer end and a pair of conforming tapered sleeve members positioned end to end and in abutted relation to each other in the tapered bore and filling the tapered portion thereof, and both removable from the inner end of the head, only the inner sleeve member being adapted to receive the inner end of the drill steel shank and form a bearing therefor, and the outer sleeve having a bore and groove portion on opposite sides adapted to receive the shank in the bore and the keys of the shank in the groove portions thereof and adapted to permit reciprocation of said shank in said outer sleeve.

CHARLES A. HULTQUIST.